United States Patent [19]

Nakajima

[11] Patent Number: 5,255,662

[45] Date of Patent: Oct. 26, 1993

[54] ENGINE AIR-FUEL RATIO CONTROLLER

[75] Inventor: Yuki Nakajima, Yokosuka, Japan

[73] Assignee: Nissan Motor Company, Ltd., Japan

[21] Appl. No.: 983,958

[22] Filed: Dec. 1, 1992

[30] Foreign Application Priority Data

Dec. 3, 1991 [JP] Japan ............... 3-319437

[51] Int. Cl.$^5$ .................. F02B 75/08; F01N 3/00
[52] U.S. Cl. .................. 123/674; 123/672; 60/276
[58] Field of Search .......... 60/276, 274, 285, 289, 60/286; 123/672, 676, 674

[56] References Cited

U.S. PATENT DOCUMENTS

| | | | |
|---|---|---|---|
| 4,974,414 | 12/1990 | Kono et al. | 60/286 |
| 5,090,199 | 2/1992 | Ikuta et al. | 60/285 |
| 5,115,639 | 5/1992 | Gopp | 60/285 |
| 5,129,228 | 7/1992 | Kondo | 60/285 |
| 5,136,842 | 8/1992 | Achleidnor et al. | 60/274 |
| 5,138,833 | 8/1992 | Kabasin et al. | 60/285 |
| 5,158,058 | 10/1992 | Yoshida et al. | 60/274 |
| 5,163,290 | 11/1992 | Kinnear | 60/274 |
| 5,168,700 | 12/1992 | Furuya | 60/285 |

FOREIGN PATENT DOCUMENTS

| | | | |
|---|---|---|---|
| 58-72647 | 4/1983 | Japan | 60/276 |
| 1-113552 | 5/1989 | Japan | 60/276 |

Primary Examiner—Raymond A. Nelli
Attorney, Agent, or Firm—Lowe, Price, LeBlanc & Becker

[57] ABSTRACT

A first O$_2$ sensor is installed upstream, and a second O$_2$ sensor downstream, of the catalyst converter in the exhaust passage of an engine. It is judged from the output of this first O$_2$ sensor whether the air-fuel ratio (AFR) has changed beyond the theoretical AFR, and AFR feedback control is performed based on the judgment result. A correction value of an AFR feedback control coefficient is previously stored in each learning area in a memory corresponding to the engine running conditions, and the fuel injection amount supplied by the fuel injector is corrected based on this correction value.

The correction value is updated by an updating amount corresponding to the magnitude of the difference between the output of the second O$_2$ sensor and a value corresponding to the theoretical AFR. Undershoot or overshoot of the AFR is thereby prevented, and the AFR is rapidly brought within a desired range.

3 Claims, 7 Drawing Sheets

ENGINE AIR-FUEL RATIO CONTROLLER

FIELD OF THE INVENTION

This invention relates to a controller which performs feedback control of the air-fuel ratio in an engine, and more specifically to an air-fuel ratio controller provided with a learning function.

BACKGROUND OF THE INVENTION

If the three-way catalyst which processes noxious components of the engine exhaust gas such as CO/HC/NOx is to function effectively, the engine must operate at the theoretical air-fuel ratio (AFR).

In an engine which uses such a three-way catalyst, therefore, it is detected whether the air/fuel mixture is on the rich or lean side, for example by installing an oxygen ($O_2$) sensor in the exhaust gas manifold, and the fuel injection amount is corrected based on this detected value so that the AFR is held in the region of the theoretical AFR.

It is however impossible to ensure sufficient quickness of response with this type of feedback control alone. Provision is therefore made to learn suitable correction amounts under different operating conditions at given sampling intervals. Fuel injection amounts are computed using these learned correction values, thereby making it possible to reduce the magnitude of the feedback correction, quicken control response and improve control precision.

A controller provided with such a learning function are for example disclosed in Tokkai Hei 1-113552 and Tokkai Sho 58-72647 published by the Japanese Patent Office. In this AFR controller, $O_2$ sensors are installed respectively upstream and downstream of a catalyst converter having a three-way catalyst.

In this controller, feedback correction of the fuel injection amount is performed based on the output of the first $O_2$ sensor upstream of the catalyst converter, learning control of the injection amount is performed by learning a correction value by the feedback control, and then the correction value is updated by fixed amounts based on the output of the second $O_2$ sensor downstream of the converter. Downstream of the catalyst, exhaust gas is well mixed and the precision of detecting the theoretical AFR by the $O_2$ sensor is high. By updating the correction value based on the output of this second $O_2$ sensor, therefore, any scatter in the output response of first $O_2$ sensor can be absorbed.

However, as the three-way catalyst has the capacity to store oxygen in the exhaust gas, there is a considerable response delay between variation of the real AFR and output variation of the second $O_2$ sensor.

If the updating amount of the correction value is set too high so that the real AFR is rapidly limited to the desired range centered on the theoretical AFR, the real AFR varies widely due to this delay so that overshoot or undershoot easily occurs.

When the real AFR waveform deviates from the desired range to the rich side, CO and HC are discharged without being efficiently converted, and when it deviates to the lean side, a large amount of NOx is discharged. It is therefore undesirable that, for example, there is a large variation of the AFR even within a short time period.

If on the other hand the updating amount of the correction value is set too small, a large variation of the AFR does not occur, however it takes a considerable time to limit the AFR to the desired range during which discharge of noxious components continues.

In such an AFR controller, therefore, it was difficult to obtain satisfactory purification of exhaust gas regardless of the value to which the updating amount was set.

SUMMARY OF THE INVENTION

It is therefore an object of this invention to enhance the limiting of the AFR in an engine to the desired range while preventing overshoot or undershoot of the AFR.

It is a further object of this invention to compensate the response delay of the $O_2$ sensor installed downstream of the catalyst so that the response of AFR learning control is quickened.

It is yet a further object of this invention to provide an AFR controller which effectively decreases the emission of noxious components.

In order to achieve the above object, this invention provides an air-fuel ratio controller for an engine provided with a fuel injector, an exhaust gas passage, and a catalyst converter using a three-way catalyst installed in the exhaust gas passage. The controller comprises a sensor for detecting the engine running conditions, a device for computing a basic fuel injection amount of the fuel injector based on the detected conditions, a first oxygen sensor installed upstream of the catalyst converter in the exhaust passage, a device for judging from the output of the first oxygen sensor whether or not the air-fuel ratio has changed beyond the theoretical air-fuel ratio, a device for computing a basic control constant of air-fuel ratio feedback based on the judgment results, a memory for storing correction values to be used for the correction of the basic control constant, each of these correction values being stored in each area defined in the memory according to the engine running conditions, a device for judging whether the detected conditions are in any of the defined areas, a device for reading from the memory the correction value corresponding to the defined area which covers the detected conditions, a device for computing an air-fuel ratio feedback correction coefficient from the read correction value and the basic control constant, a device for computing a target fuel injection amount from the basic fuel injection amount and air-fuel feedback correction coefficient, a device for controlling the fuel injection amount supplied by the fuel injector to the target amount, a second oxygen sensor installed downstream of the catalyst converter in the exhaust passage, a device for setting an updating amount of the correction value which becomes larger when the output of the second oxygen sensor deviates largely from a value corresponding to the theoretical air-fuel ratio, and becomes smaller in the region of an intermediate value, and a device for updating the correction value stored in the memory corresponding to the defined area covering the detected conditions, by the set updating amount.

Preferably, the setting device sets an updating amount proportional to the deviation of the output of the second oxygen sensor from the value corresponding to the theoretical air-fuel ratio.

Alternatively, the setting device sets an updating amount in steps corresponding to the deviation of the output of the second oxygen sensor from the value corresponding to the theoretical air-fuel ratio.

The details as well as other features and advantages of this invention are set forth in the remainder of the

DESCRIPTION OF THE PREFERRED EMBODIMENTS

Figure 1:
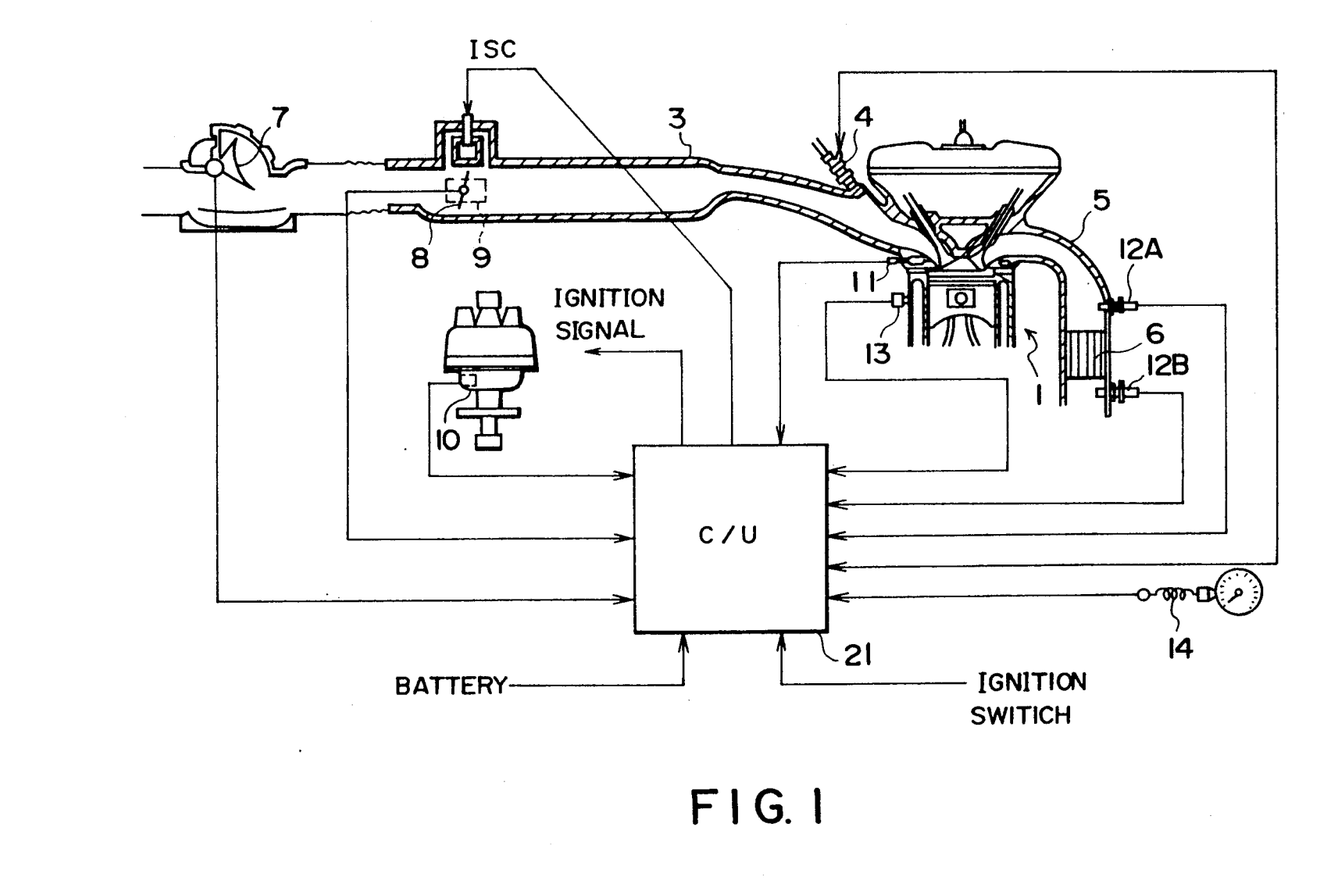
FIG. 1 is a schematic diagram of an AFR controller according to this invention.

Referring to FIG. 1 of the drawings, intake air entering an automobile engine passes from an air cleaner through an intake passage 3, and flows into an engine cylinder under control by a throttle valve 8 which operates in conjunction with the vehicle's accelerator pedal. Fuel is injected from a fuel injector 4 installed in each cylinder according to an injection signal from a CPU 21. The mixture of this injected fuel and air flowing into the cylinder is burnt inside the cylinder with the aid of the spark plug, and the burnt gas depresses the piston.

The burnt gas which has depressed the piston is led to the catalyst converter 6 which uses a three-way catalyst, wherein toxic components (CO, HC, NOx) are eliminated from the gas and discharged to the atmosphere.

The intake air volume Qa is detected by an air flow meter 7, the opening TVO of the throttle 8 is detected by a throttle opening sensor 9, the speed Ne of the engine 1 is detected by a crank angle sensor 10, the temperature Tw of the cooling water in the jacket of the engine is detected by a water temperature sensor 11, the presence or absence of knocking is detected by a knocking sensor 13, and the running speed is detected by a vehicle speed sensor 14. All the data detected by these sensors is input as signals to the control unit 21.

A first $O_2$ sensor 12A is installed upstream, and a second $O_2$ sensor 12B downstream, of the catalyst converter 6 in an exhaust passage 5. Both the sensor 12A and the sensor 12B react to the oxygen concentration of the exhaust gas so that their output varies sharply at the theoretical AFR. The output at an oxygen concentration corresponding to the theoretical AFR is therefore set as a slice level S/L, and it is detected whether the real AFR is on the rich or lean side relative to the theoretical AFR by comparing the sensor output with this S/L.

The control unit 21, based on the outputs of the $O_2$ sensors 12A, 12B and the following relation, controls the fuel amount injected by the injector 4 such that the real AFR is maintained near the theoretical AFR. This fuel injection amount is expressed as a fuel injection pulse width Ti of the injector 4:

$$Ti = Tp \times Co \times \alpha + Ts$$

where
Tp = basic injection pulse width ($= K \cdot Qa/Ne$, and K is a constant),
Co = sum of various coefficients depending on engine running conditions
$\alpha$ = feedback correction coefficient
Ts = ineffectual pulse width of fuel injector This control is performed by proportional-plus-integral control. More specifically, (1) When the AFR varies from rich to lean, the value of $\alpha$ is shifted to the rich side in stepwise fashion by a proportional amount $P_R$.
(2) When lean conditions continue, the value of $\alpha$ is shifted to the rich side by an integral amount $I_R$ at every control cycle.
(3) When the AFR varies from lean to rich, the value of $\alpha$ is shifted to the lean side in stepwise fashion by a proportional amount $P_L$.
(4) When rich conditions continue, the value of $\alpha$ is shifted to the lean side by an integral amount $I_L$ at every control cycle.

A map of these proportional amounts $P_R$, $P_L$ is constructed with the engine speed Ne and a basic injection pulse width Tp as parameters, and is stored in the memory of the control unit 21. The control unit 21 looks up values of $P_R$, $P_L$ by on this map based on the detected running conditions.

Figure 6:
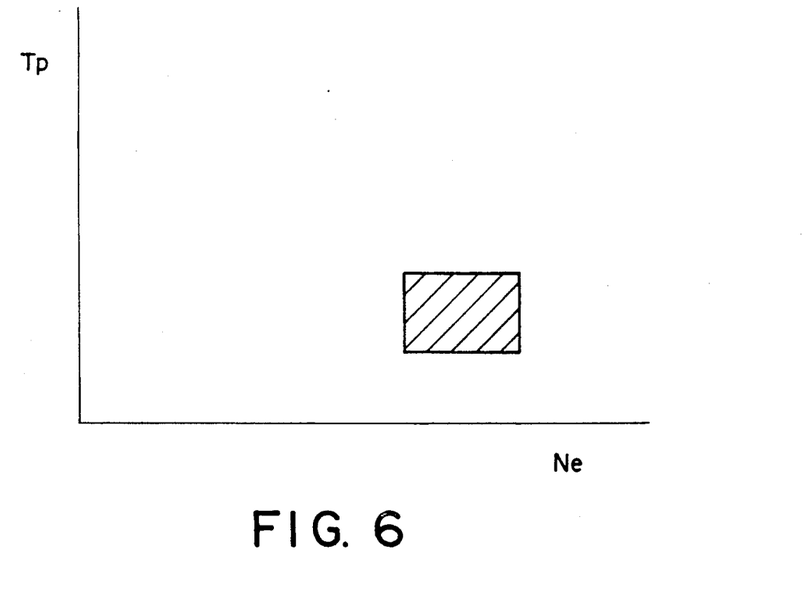
FIG. 6 is a graph showing a special region on the map of proportional amounts $P_R$ and $P_L$ of the proportional plus integral AFR control according to this invention.

The shaded area in FIG. 6 is an area where surging of the vehicle is liable to occur. In constructing the aforesaid map, particularly small values are given for $P_R$ and $P_L$ in this area so that surging is prevented.

Regarding the integral amounts $I_R$, $I_L$, a map of $i_R$ and $i_L$ is stored in the memory of the control unit 21. $I_R$, $I_L$ are calculated by multiplying the map values $i_R$, $i_L$ which depend on the running conditions by the engine load. The fuel injection pulse width Ti in the immediately preceding control cycle is used as the engine load.

The integral amounts $I_R$, $I_L$ are made to vary according to the engine load as it enables the three-way catalyst to clean the exhaust gas most efficiently when the AFR varies with a specific amplitude. In the low engine speed region, in which the control interval of the AFR is large, $\alpha$ tends to have a large amplitude; conversely, in the high engine speed region, in which the control interval of the AFR is short, $\alpha$ tends to have a small amplitude. By multiplying the values $i_R$, $i_L$ read from the map by a coefficient corresponding to the engine load, the amplitude of $\alpha$ is adjusted to be smaller in the low engine speed region, and larger in the high engine speed region. In this way, the amplitude of $\alpha$ is held within a desired range irrespective of the control interval of $\alpha$.

Figure 2:
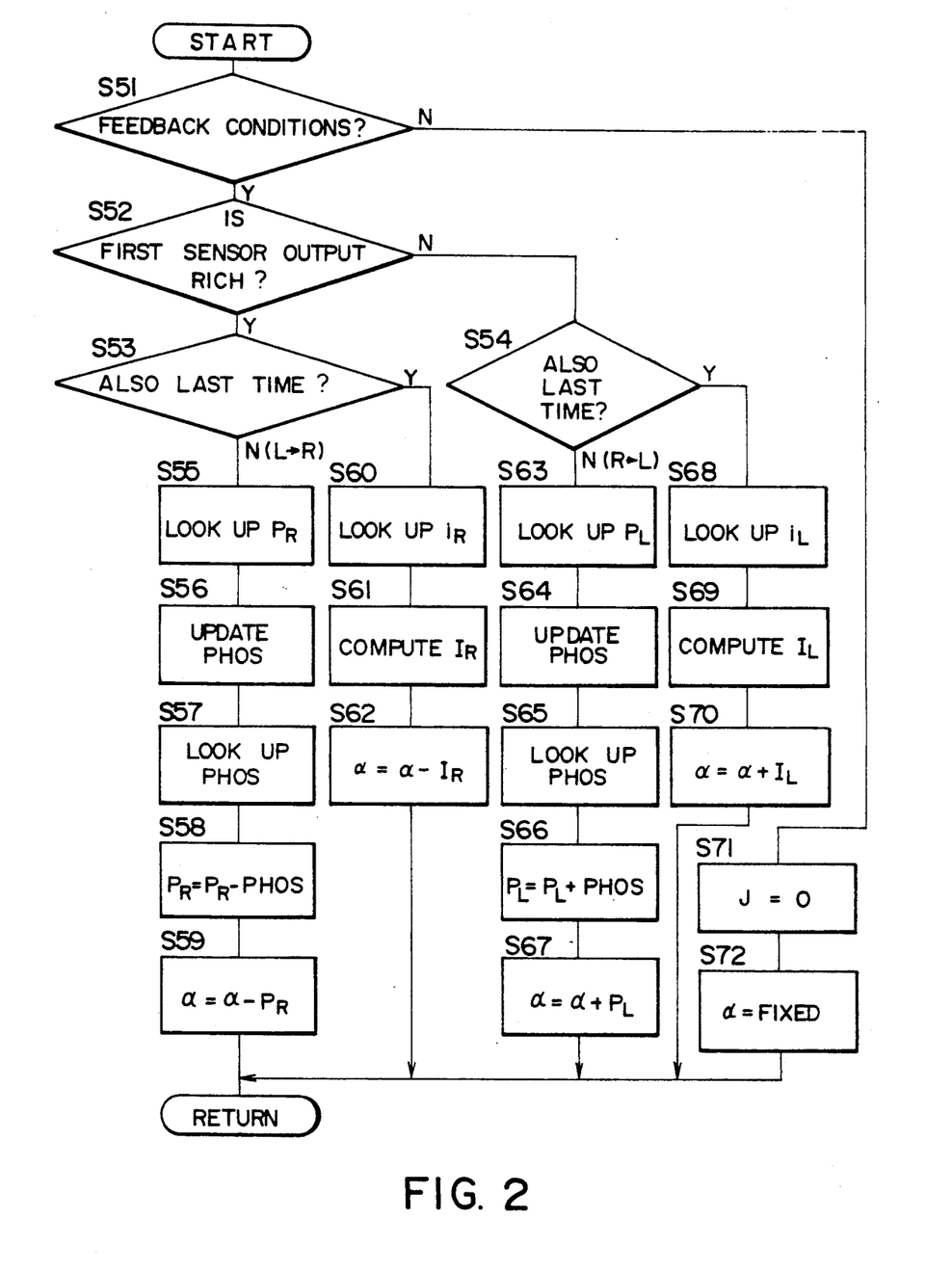
FIG. 2 is a flowchart showing a process of computing a feedback correction coefficient according to this invention.

FIG. 2 shows a basic AFR feedback control routine executed by the control unit 21 according to the output of the first $O_2$ sensor 21A. This control is synchronized with the speed of the engine 1.

First, in a step 51, it is judged whether or not the engine 1 satisfies feedback control conditions. This step is performed except when it is not desirable to control the AFR to the theoretical AFR, such as for example immediately after starting the engine. If the feedback control conditions are not satisfied, a counter value J denoting an AFR inversion count is set equal to 0 in a step 71, the AFR feedback control coefficient $\alpha$ is fixed at its value in the previous control cycle, and the routine is terminated in a step 72.

If the feedback control conditions are satisfied in the step 51, it is judged from the output of the first $O_2$ sensor 12A whether the AFR has changed to rich or lean beyond the slice level. Based on the results of this judgment, the proportional amounts $P_R$, $P_L$ and integral amounts $i_R$, $i_L$ are then found by referring to the map stored in the control unit 21 in steps 55, 60, 63 and 68.

Of these values, the map values $P_R$, $P_L$ of the proportional amounts are respectively updated by a correction value PHOS in steps 58 and 66. This correction value PHOS is found by a subroutine shown in FIG. 5 in steps 57 and 65. As shown in steps 112 and 113 of FIG. 5, this is achieved by searching a map of correction values PHOS stored in the memory of the control unit 21, and reading a value stored in a learning region of the map corresponding to the present running conditions.

Figure 5:
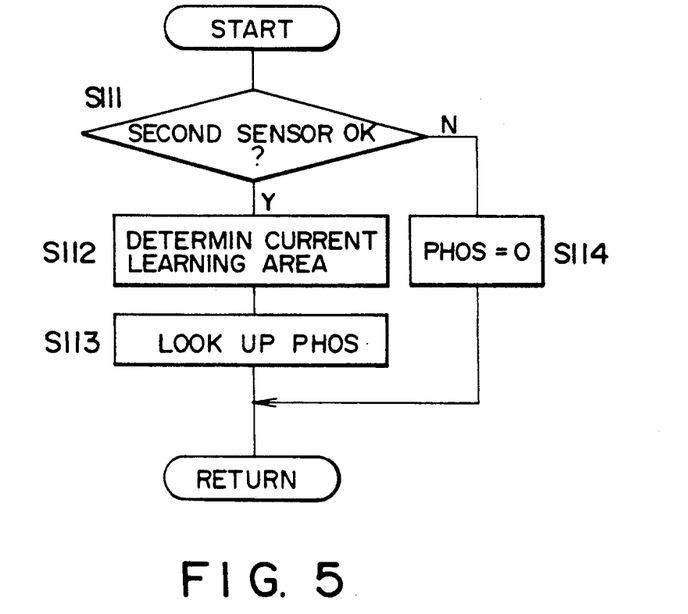
FIG. 5 is a flowchart showing a process of reading the correction value PHOS according to this invention.

If a fault appears in the second $O_2$ sensor 12B, the correction values are no longer reliable. In this case, PHOS is set equal to 0 and the learning function is abandoned (steps 111, 114).

Likewise, $I_R$, $I_L$ are computed from the map values $i_R$, $i_L$ of the integral amounts in steps 61 and 69.

In steps 59, 62, 67 and 70, the AFR feedback coefficient $\alpha$ is then computed from the proportional amounts $P_R$, $P_L$ and integral amounts $I_R$, $I_L$ found as described hereintofore, and the computed $\alpha$ is substituted into the aforesaid equation in order to compute the fuel injection pulse width Ti.

Figure 3:
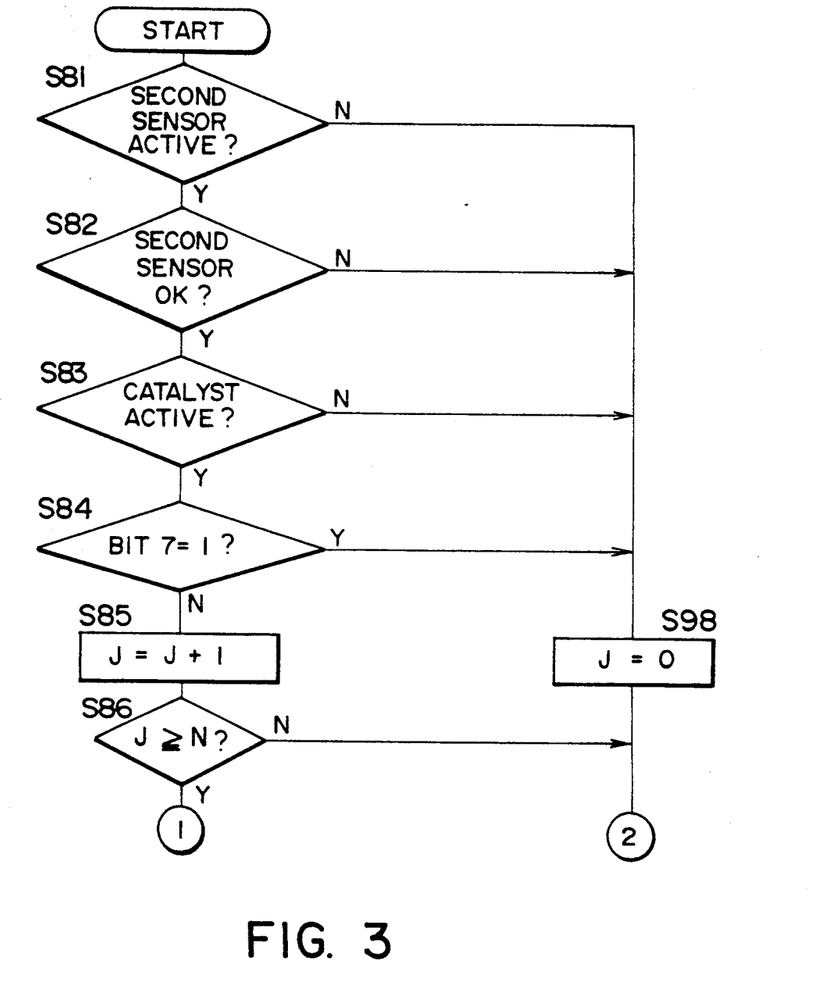
FIG. 3 and FIG. 4 are flowcharts showing a process of updating a correction value PHOS according to this invention.
Figure 4:
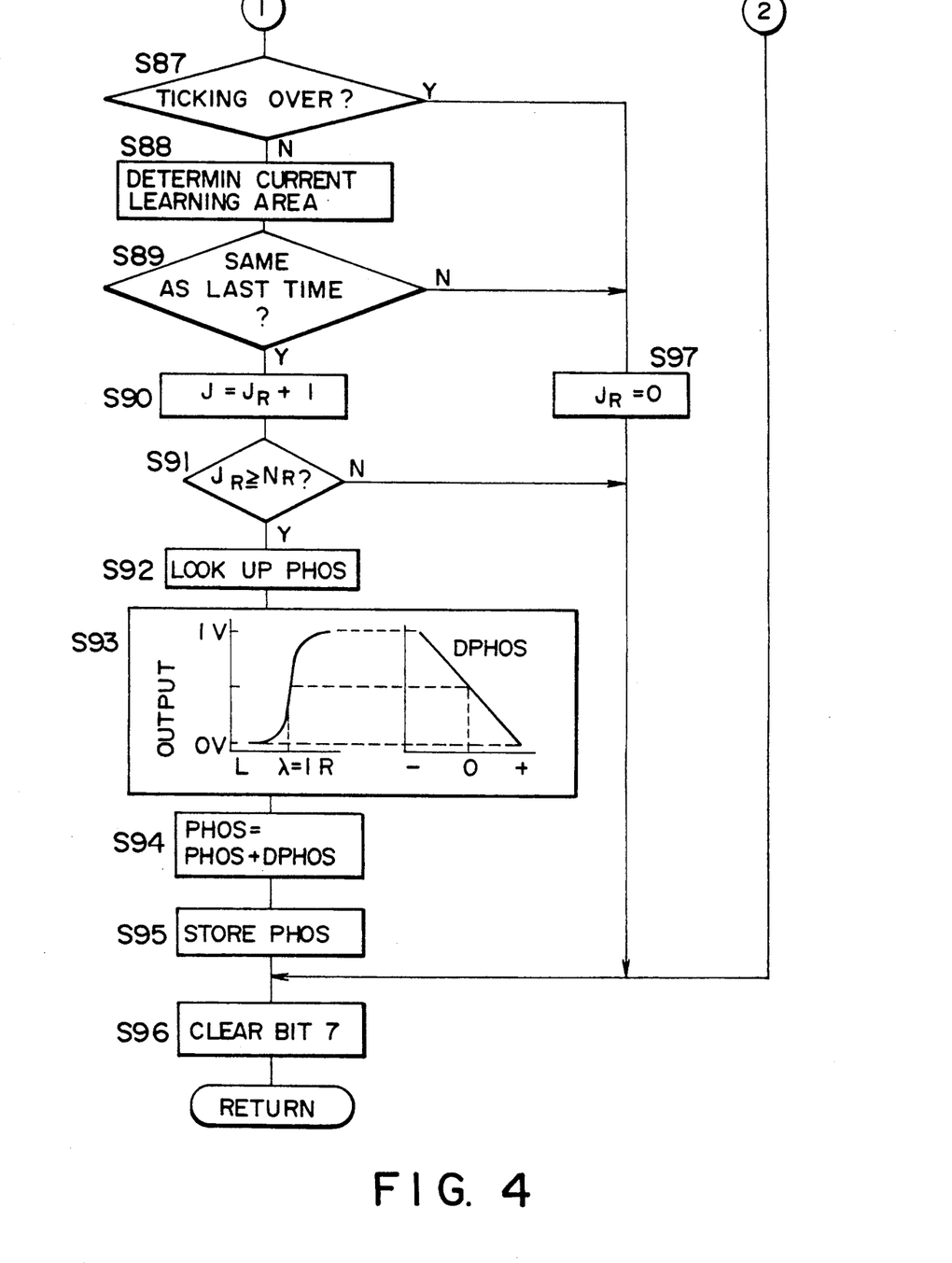

The correction value PHOS is also updated by the subroutines shown in FIGS. 3 and 4 in steps 56 and 64 based on the output of the second $O_2$ sensor 12B when certain learning conditions are satisfied. This subroutine is performed each time the output of the first $O_2$ sensor 12A is inverted.

In this routine, it is first verified in steps 81 to 91 whether or not the following learning conditions (1) to (7) are satisfied:

(1) The second $O_2$ sensor 12B is active (step 81).
(2) The second $O_2$ sensor is not faulty (abbreviated in the figure as "OK") (step 82).
(3) The catalyst converter 6 is active (step 83).
(4) The running conditions are outside the special region shown in FIG. 6 (step 84).

As the numerical $P_R$, $P_L$ information stored in the map contains a bit which is not used, this bit is set to be "1" for values corresponding to the special region shown in FIG. 6. If for example this bit is bit 7 and the value of the bit 7 is "1", it is judged in a step 84 that the running conditions are in the special region, while if the value of the bit 7 is not "1", it is judged in the step 84 that the running conditions are outside the special region.

(5) AFR control is performed a certain number of times outside the special region (steps 85, 86).

The counter value J in the step 85 denotes the number of AFR inversions after it is judged that the running conditions are not in the special region. The control unit 21 compares this counter value J with a constant value N (e.g. 12), and if $J \geq N$, it is judged that AFR control has been performed a certain number of times outside the special region. This is made a condition for learning so that updating of correction values is performed after AFR control has become stable.

(6) The engine is not ticking over (step 87).

In this embodiment, AFR feedback control is terminated when the engine is ticking over.

(7) Identical running conditions have continued for a fixed number of control cycles in the same learning region (steps 88 to 91).

Figure 7:
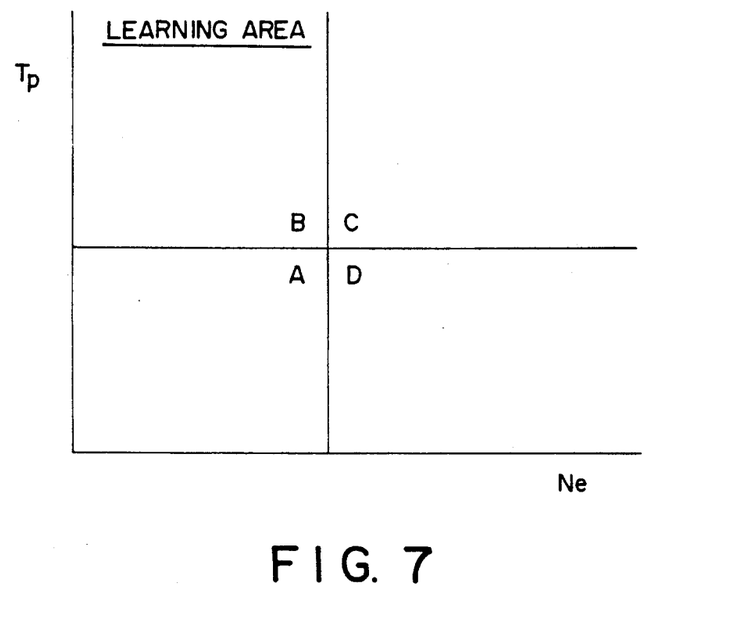
FIG. 7 is a graph showing a learning region of the correction value PHOS according to this invention.

As can be seen from the map of FIG. 7, the learning region is divided into 4 areas A, B, C, D of approximately equal size by the engine speed Ne and the basic injection pulse width Tp, and a correction value PHOS is stored in each of these areas.

The control unit 21 examines whether the present running conditions correspond to any of these learning areas, and if the learning area is the same as that on the immediately preceding occasion, the counter value $J_R$ is incremented by 1 (steps 88 to 90). Also, this counter value $J_R$ is compared to a fixed value $N_R$ (e.g. 6), and if $J_R \geq N_R$ (step 91), it is judged that the running conditions have continued for a given number of control cycles in the same learning area.

If all the aforesaid conditions (1) to (7) are satisfied, it is judged that learning control can be performed.

In a step 92, a correction value PHOS stored in the learning area to which the present running conditions correspond is read, an updating amount DPHOS is found in a step 93, and the correction value PHOS is updated in a step 94.

The updating amount DPHOS is given a negative value if the AFR detected by the second $O_2$ sensor 12B is rich, and is given a positive value if the AFR is lean.

In the step 94, PHOS is updated by adding the updating amount DPHOS to the correction value PHOS, and if a negative value is given to the updating amount DPHOS when the AFR is rich, the correction value PHOS becomes smaller. As a result, the proportional amount $P_R$ when the AFR in the step 58 when the AFR is rich increases, and the proportional amount $P_L$ when the AFR is lean in the step 66 decreases. In this way, the AFR returns to the lean side.

In a similar manner, if a positive value is given to the correction value DPHOS when the AFR is lean, the AFR returns to the rich side. It is also permissible to modify only one of the proportional amounts $P_R$, $P_L$.

If the AFR is far from the theoretical AFR, the updating amount DPHOS of the correction value must be made large so as to bring the AFR rapdily within the normal range. However, having the updating amount large when the AFR is close to the theoretical AFR causes large fluctuations of the AFR which is undesirable.

The oxygen concentration of the exhaust gas upstream of the catalyst converter 6 fluctuates rapidly between rich and lean about a value corresponding to the theoretical AFR. The output characteristics of the first $O_2$ sensor 12A are therefore arranged to vary in a similar way about 0.5 V which corresponds to the theoretical AFR. On the other hand, the exhaust gas downstream of the catalyst converter 6 is well mixed and the oxygen concentration is smoothed out after the gases have passed through the three-way catalyst. The oxygen concentration therefore does not deviate so much, so the output of the second $O_2$ sensor 12B is made to vary slowly in the region of 0.5 V corresponding to the theoretical AFR.

Figure 8:
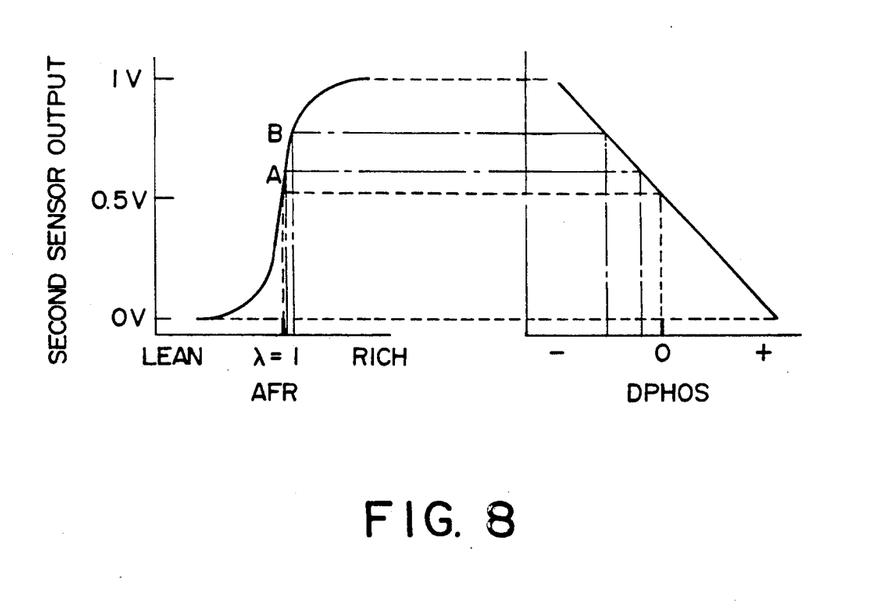
FIG. 8 is a graph showing the relation between a correction value updating amount DPHOS and the output of a second $O_2$ sensor according to this invention.
Figure 9:
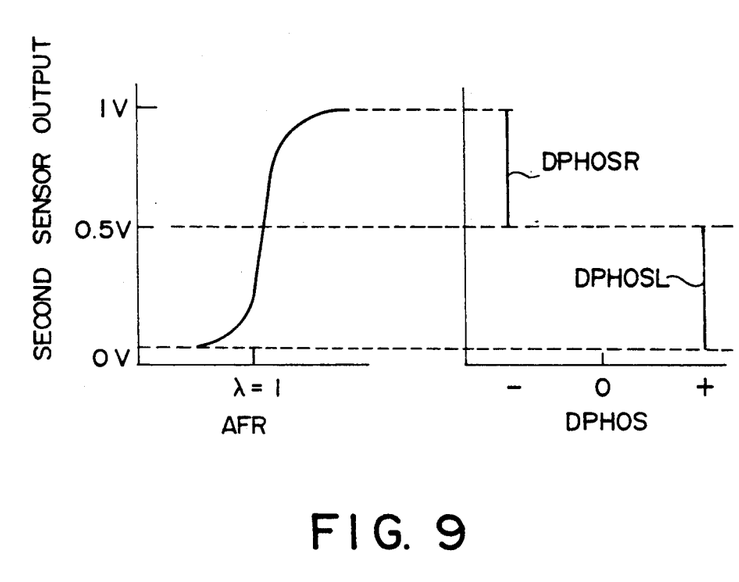
FIG. 9 is identical to FIG. 8, but shows another embodiment of this invention.

Since the output of the second $O_2$ sensor 12B varies slowly in the region of a value corresponding to the theoretical AFR, the deviation of the real AFR from the theoretical AFR can be accurately detected even when it is not far from the theoretical AFR as shown by A and B in FIG. 8, this difference not being apparent from the output of first O₂ sensor 12A.

If, therefore, the updating amount DPHOS of the correction value is made a variable quantity depending on the difference between the output of the sensor 12B and a value corresponding to the theoretical AFR, overshoot or undershoot of the AFR can be prevented, the AFR can be rapidly brought within the desired range, and the amount of noxious components discharged by the vehicle can be reduced.

The updating amount DPHOS is therefore not given a fixed value, but a value depending on the output of the second O₂ sensor 12B such that it increases the greater the deviation from an intermediate value of this output, and decreases near this intermediate value (step 93).

The output waveform of the second O₂ sensor 12B as shown in FIG. 8, is substantially periodic and fluctuates between a minimum of 0 V and a maximum of 1 V about 0.5 V as center. If a line of negative slope is marked on the right-hand part of the curve having this output on the vertical axis and the updating amount DPHOS on the horizontal axis, and the updating amount DPHOS is set to 0 at 0.5 V which is the intermediate value of the output of the second O₂ sensor 12B, the absolute value of DPHOS increases the more the output of the second O₂ sensor 12B deviates from the intermediate value.

Comparing points A and B on FIG. 8, for example, DPHOS corresponding to the point B located farther from the intermediate value of 0.5 V has a greater absolute value than DPHOS corresponding to the point A located closer to the intermediate value.

The correction value is thus updated by adding the updating amount DPHOS to the correction value PHOS read in the step 92, and the updated correction value PHOS is then stored in the learning area (steps 94, 95).

Finally, the value of bit 7 in the numerical data on the map of $P_R$, $P_L$ is cleared (step 96). This is because, if bit 7 is not cleared and its value is "1", it would be mistakenly treated as a part of a numerical value read from the map.

FIG. 11 shows another embodiment of this invention wherein the updating amount DPHOS is given a fixed value in a region far from the intermediate value of the output of the second O₂ sensor 12B, and the updating amount DPHOS is set to 0 in a predetermined region having the intermediate value of 0.5 V as center.

If the updating amount DPHOS given in FIG. 8 is made a continuous variable, this embodiment corresponds to the case where the updating amount DPHOS is made up of discrete values. Comparing the two methods, learning precision is better if the updating amount is a continuous variable, but the memory capacity of the control unit 21 does not have to be so large if it consists of discrete values.

Even if the value of DPHOS is varied in steps, therefore, the AFR can be rapidly limited to the desired range, undershoot and overshoot can be prevented, and emission of toxic components can be decreased.

In the aforesaid embodiment, updating of correction values was applied to the proportional amounts $P_R$, $P_L$, but it can be applied also to the integral amounts $I_R$, $I_L$.

Further, in this embodiment, a special region was designated on the map of proportional amounts $P_R$, $P_L$, but this has no direct bearing on the invention which may be applied also to a map without any such special regions.

The foregoing description of the preferred embodiments for the purpose of illustrating this invention is not to be considered as limiting or restricting the invention, since many modifications may be made by those skilled in the art without departing from the scope of the invention.

The embodiments of this invention in which an exclusive property or privilege is claimed are defined as follows:

1. An air-fuel ratio controller for an engine provided with a fuel injector, an exhaust gas passage, and a catalytic converter using a three-way catalyst installed in an exhaust gas passage, said controller comprising:
    a sensor for detecting engine running conditions,
    means for computing a basic fuel injection amount for the fuel injector based on said engine running conditions detected by said sensor,
    a first oxygen sensor installed upstream of said catalytic converter in the exhaust passage,
    means for determining from the output of said first oxygen sensor whether the air-fuel ratio has varied beyond a predetermined theoretical air-fuel ratio,
    means for computing a basic control constant of air-fuel ratio feedback based on the determining results,
    a memory for storing correction values to be used for the correction of the basic control constant, each of said correction values being stored in each area defined in the memory according to said engine running conditions,
    means for determining whether said engine running conditions detected by said sensor are in any of the defined areas,
    means for retrieving from said memory a correction value corresponding to the defined area which covers said engine running conditions,
    means for computing an air-fuel ratio feedback correction coefficient from the retrieved correction value and said basic control constant,
    means for computing a target fuel injection amount from said basic fuel injection amount and said air-fuel feedback correction coefficient,
    means for controlling the fuel injection amount supplied by the fuel injector to the target amount,
    a second oxygen sensor installed downstream of the catalytic converter in the exhaust passage,
    means for setting an updating amount of said correction value such that it becomes larger when the output of said second oxygen sensor deviates a predetermined amount from a value corresponding to said predetermined theoretical air-fuel ratio, and becomes smaller in the region of a predetermined intermediate value, and
    means for updating said correction value stored in said memory corresponding to said defined area covering said engine running conditions detected by said sensor, by said set updating amount.

2. An air-fuel ratio controller as defined in claim 1 wherein said setting means sets an updating amount proportional to the deviation of the output of the second oxygen sensor from the value corresponding to the predetermined theoretical air-fuel ratio.

3. An air-fuel ratio controller as defined in claim 1 wherein said setting means sets an updating amount in steps corresponding to the deviation of the output of the second oxygen sensor from the value corresponding to the predetermined theoretical air-fuel ratio.

* * * * *